(12) United States Patent
Cornwell

(10) Patent No.: US 7,497,647 B2
(45) Date of Patent: Mar. 3, 2009

(54) DEVICE FOR ORIENTING A WORK TOOL AT A PREDETERMINED ATTITUDE RELATIVE TO A WORK PIECE

(75) Inventor: W. Robert Cornwell, Ronan, MT (US)

(73) Assignee: Jore Corporation, Pasco, WA (US)

( * ) Notice: Subject to any disclaimer, the term of this patent is extended or adjusted under 35 U.S.C. 154(b) by 367 days.

(21) Appl. No.: 11/138,654

(22) Filed: May 26, 2005

(65) Prior Publication Data

US 2006/0269370 A1 Nov. 30, 2006

(51) Int. Cl.
B23B 47/28 (2006.01)

(52) U.S. Cl. .................. 408/115 R; 408/202; 408/110

(58) Field of Classification Search ............. 408/72 R, 408/115 R, 72 B, 115 B, 202, 203, 239 A, 408/241 S, 241 G, 241 B, 97, 110
See application file for complete search history.

(56) References Cited

U.S. PATENT DOCUMENTS

| | | | | |
|---|---|---|---|---|
| 1,212,634 A | * | 1/1917 | Hathaway | 82/1.3 |
| 2,625,062 A | * | 1/1953 | Heil | 408/79 |
| 2,996,936 A | * | 8/1961 | Blaise | 408/16 |
| 3,006,223 A | * | 10/1961 | Broussard | 408/85 |
| 3,083,593 A | * | 4/1963 | Cotter | 408/241 R |
| 3,907,452 A | * | 9/1975 | Tripp | 408/56 |
| 4,027,992 A | * | 6/1977 | Mackey et al. | 408/97 |
| D262,938 S | * | 2/1982 | Schulze | D8/70 |
| 4,329,783 A | * | 5/1982 | Maresca | 33/542 |
| 4,375,341 A | * | 3/1983 | Schulze | 408/72 R |
| 4,586,846 A | * | 5/1986 | Kellison | 404/6 |
| 4,736,658 A | | 4/1988 | Jore | |
| 4,896,663 A | * | 1/1990 | Vandewalls | 606/79 |
| 4,948,304 A | * | 8/1990 | Kobayashi | 408/16 |
| 4,955,766 A | | 9/1990 | Sommerfeld | |
| 4,961,674 A | | 10/1990 | Wang et al. | |
| 5,182,973 A | * | 2/1993 | Martindell | 81/429 |
| 5,207,681 A | * | 5/1993 | Ghadjar et al. | 606/96 |
| 5,375,949 A | * | 12/1994 | McHenry, Jr. | 408/1 R |
| 5,893,684 A | * | 4/1999 | Skaggs | 408/1 R |
| 6,302,408 B1 | * | 10/2001 | Zierpka | 279/75 |
| 6,755,424 B1 | * | 6/2004 | Paulsen | 279/145 |
| 2006/0134957 A1 | * | 6/2006 | Cornwell | 439/190 |

FOREIGN PATENT DOCUMENTS

| | | | |
|---|---|---|---|
| EP | 1595627 A2 | * | 11/2005 |
| JP | 51122887 A | * | 10/1976 |
| WO | WO 0074884 A1 | * | 12/2000 |

* cited by examiner

*Primary Examiner*—Daniel W Howell
(74) *Attorney, Agent, or Firm*—Christensen O'Connor Johnson Kindness PLLC

(57) ABSTRACT

A device (20) for orienting a work tool (10) at a predetermined attitude relative to a work piece includes a base (22) having a first surface (34 or 44) abuttable against a work piece, a sleeve (24) coupled to the base, and a shaft (26) slidably receivable within the sleeve. The shaft has a first end portion (80) and a second end portion (82), wherein the first end portion is connectable to a work tool and the second end portion is connectable to an actuator for actuating the work tool.

19 Claims, 7 Drawing Sheets

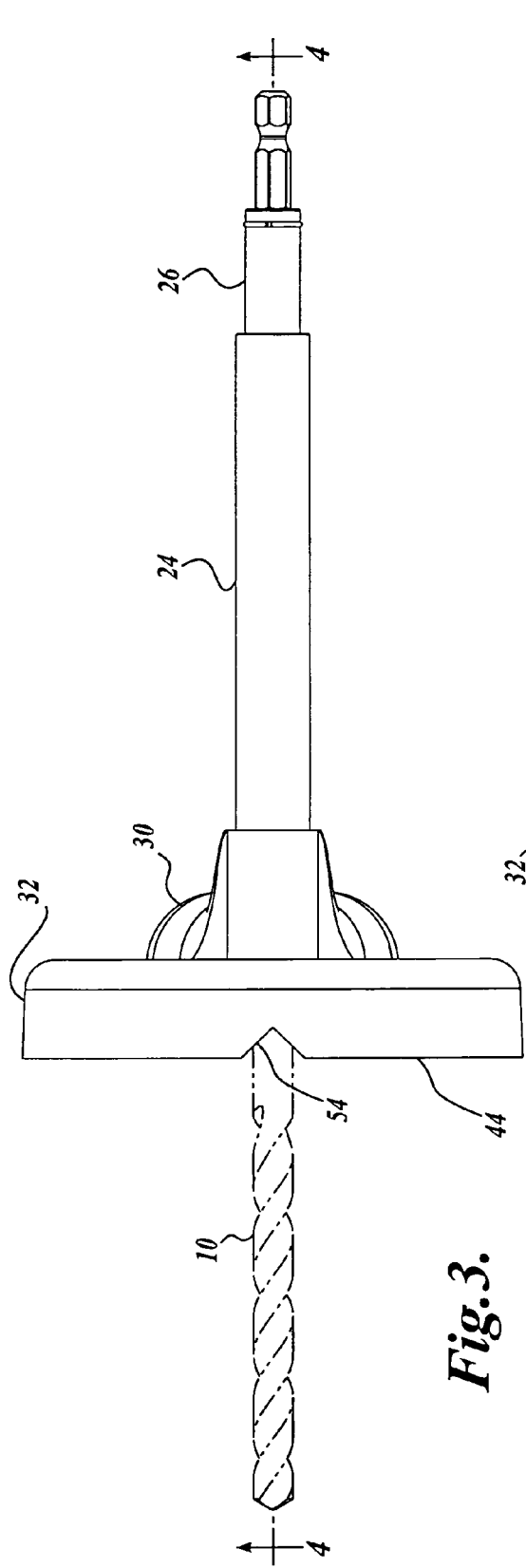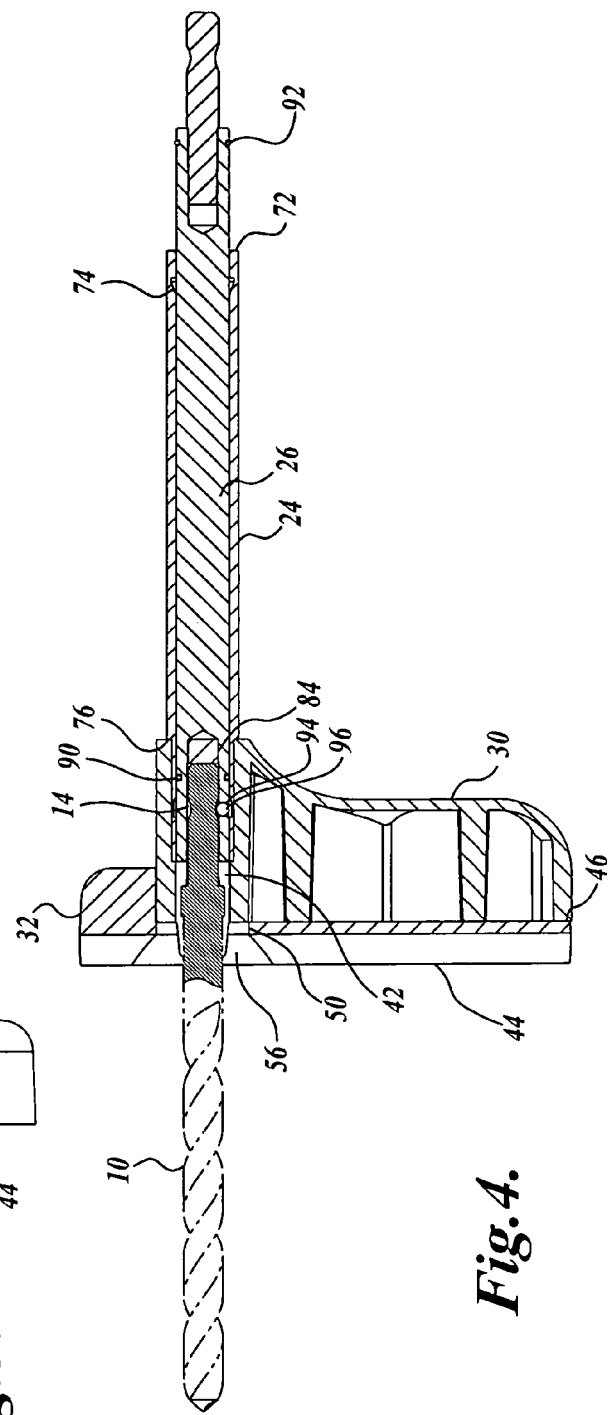

DEVICE FOR ORIENTING A WORK TOOL AT A PREDETERMINED ATTITUDE RELATIVE TO A WORK PIECE

FIELD OF THE INVENTION

The embodiments described herein relate generally to devices for orienting a work tool relative to a work piece, and more specifically to devices for orienting a work tool at a predetermined attitude relative to a work piece.

BACKGROUND OF THE INVENTION

Currently, there are few options for drilling a hole in a work piece at a predetermined attitude relative to a work piece. The most reliable method is to clamp a work piece into a vice, then use a drill press to properly align the hole.

Another device used for drilling at a predetermined attitude is to use a drill with a level attached to it. However, drills with levels attached are only useful for drilling into vertical surfaces (i.e., when the level is horizontal). Levels are not effective for controlling drilling at a predetermined attitude when the user is drilling into horizontal or angled surfaces.

Other devices include large bases or plastic templates that can be attached to a drill. A drill with a large base attached keeps the drill oriented on a surface. However, these large bases are very bulky, are not suited for drilling at edges or in corners, and are not adjustable for drilling at an angle or into non-flat surfaces, such as spherical or cylindrical surfaces.

Plastic templates that guide a drill accept different bushings for different drill sizes. These templates allow a user to drill at 45 or 90-degree angles, as well as into spherical surfaces. This system, however, uses many loose parts that tend to get lost. In addition, the tolerances of the bushings are often so loose that a similar result could be achieved by free-hand drilling.

Therefore, there exists a need for a device for orienting a work tool at a predetermined attitude relative to a work piece that is compact, reliable, and does not need to be assembled or interchanged for different angles or non-planar surfaces, such as spherical surfaces.

SUMMARY OF THE INVENTION

A device for orienting a work tool at a predetermined attitude relative to a work piece includes a base having a first surface abuttable against a work piece, a sleeve coupled to the base, and a shaft slidably receivable within the sleeve. The shaft has a first end portion and a second end portion, wherein the first end portion is connectable to a work tool and the second end portion is connectable to an actuator for actuating the work tool.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a side view of the device of FIG. 1;

FIG. 4 is a cross-sectional side view of the device of FIG. 1;

DETAILED DESCRIPTION OF THE PREFERRED EMBODIMENT

Figure 1:
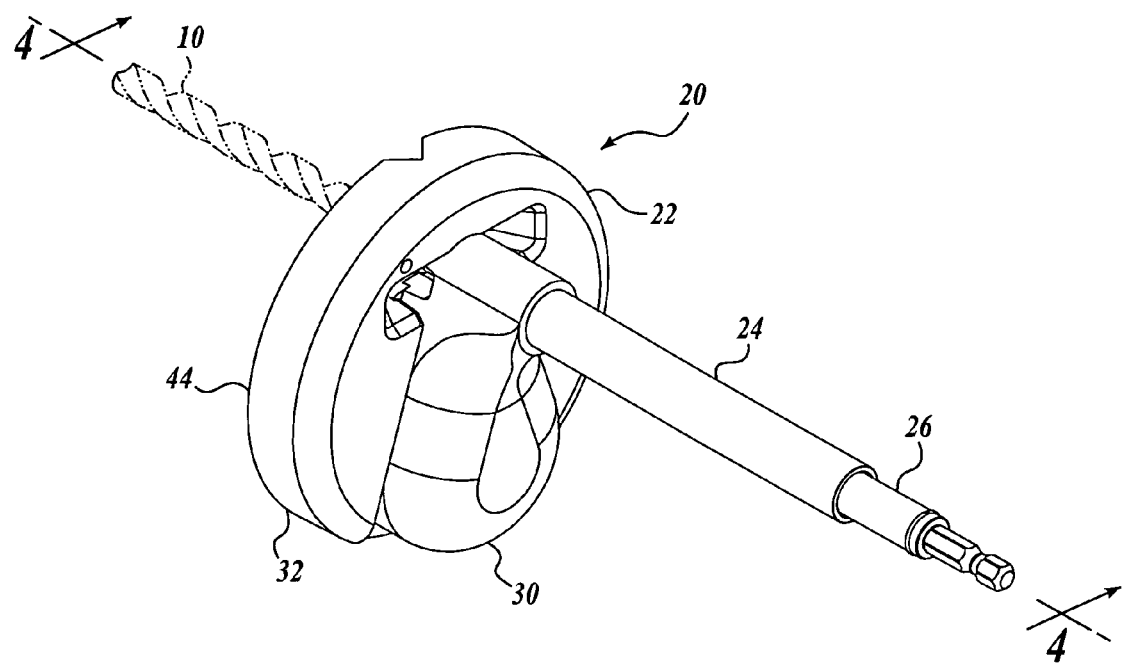
FIG. 1 is an isometric view of a device for orienting a work tool at a predetermined attitude relative to a work piece in accordance with one embodiment of the present invention.
Figure 2:
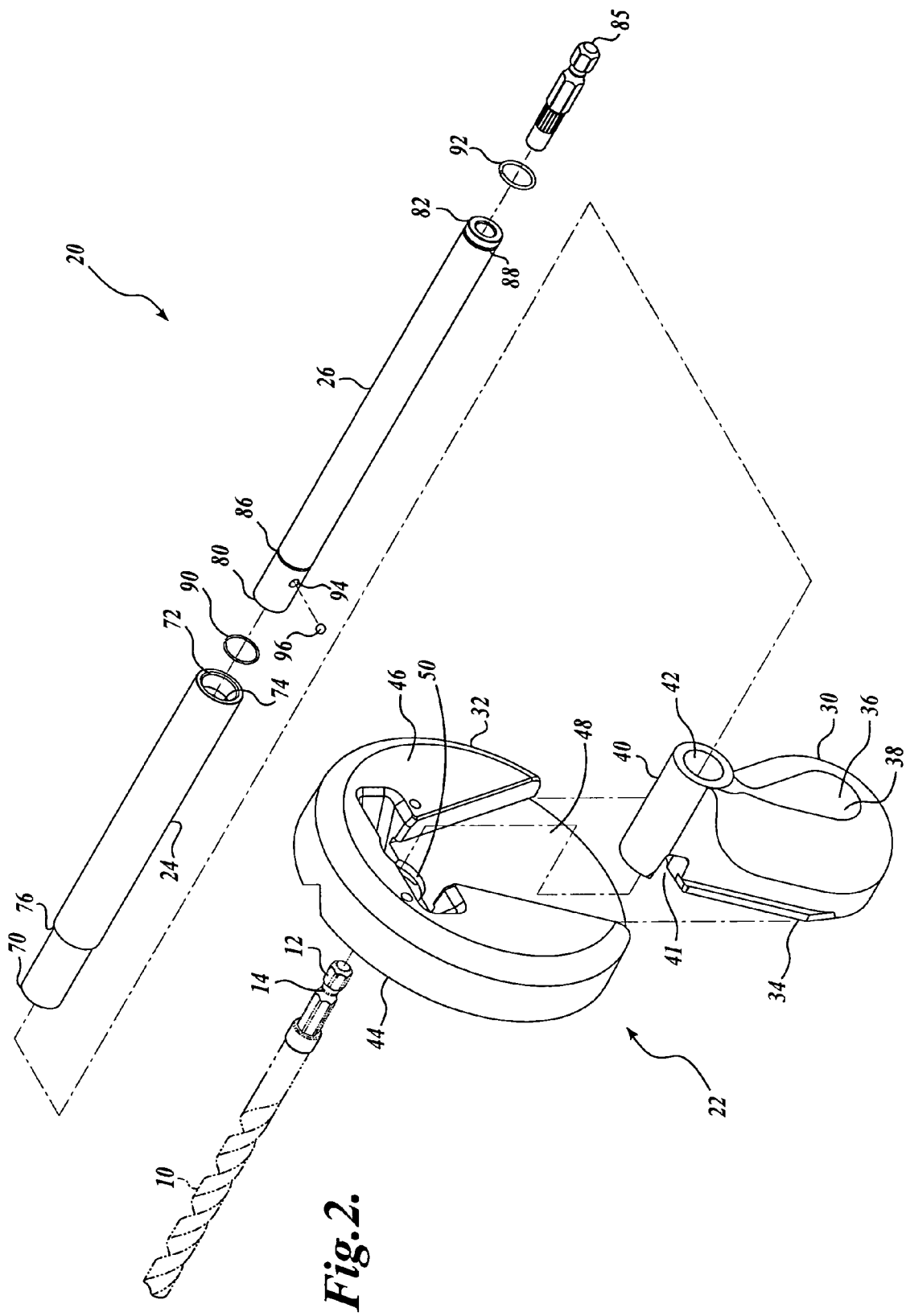
FIG. 2 is an exploded view of the device of FIG. 1.

A device 20 for orienting a work tool at a predetermined attitude relative to a work piece constructed in accordance with one embodiment of the present invention may be best understood by referring to FIGS. 1 and 2. The device 20 generally includes a base 22, a sleeve 24, and a shaft 26 closely, rotably, and/or slidably receivable within the sleeve 24.

The work tool 10 of the illustrated embodiments may be a drill bit. It should be appreciated, however, that other work tools may be used in conjunction with the embodiments of the present invention, for example, punches, chisels, axial reamers, and rotational reamers.

Referring to FIGS. 1-7, the base 22 includes a first smaller foot 30 in combination with a second larger foot 32. Although the first foot 30 and the second foot 32 are generally used in combination, the first foot may also be used alone, without the second foot, as discussed in greater detail below.

The first foot 30 is generally an orienting member, which may be formed in a tapering tear-drop shape. Referring to FIG. 2, the first foot 30 may include a first forward surface 34 and a second rearward surface 36. The first forward surface 34 may be a substantially flat surface. The second rearward surface 36 is shaped to define a hand grip 38 configured for a user to securely grip and apply pressure to hold the first foot 30 against a work piece.

The first foot 30 further includes a tubular portion 40 adjacent the hand grip 38. The tubular portion 40 has an aperture 42 extending therethrough, configured to closely receive the sleeve 24 and/or the work tool 10. The aperture 42 may be offset relative to the center of the second rearward surface 36 of the first foot 30, such that the aperture 42 is adjacent a peripheral portion of the first foot 30 (FIG. 5), as described in detail below. It should be appreciated, however, that a centered tubular portion 40 and aperture 42 is also within the scope of the invention.

In the illustrated embodiment of FIGS. 1-7, the tubular portion 40 may be positioned at a substantially perpendicular attitude to the first forward surface 34 of the first foot 30, and subsequently, to the work piece. Accordingly, when coupled to the first foot 30, the sleeve 24 is also positioned at a substantially perpendicular attitude to the first forward surface 34 of the first foot 30 and subsequently, to the work piece.

Although positioning the tubular portion 40 at a substantially perpendicular attitude to the work piece is illustrated as a suitable configuration for the first foot 30, it should be appreciated that other predetermined positioning attitudes are also within the scope of the invention. As a non-limiting example, the tubular portion 40 may be positioned transversely to the first forward surface 34 of the first foot 30. It should also be appreciated that the tubular portion 40 of the first foot 30 may include an adjustable neck for positioning the tubular portion 40 at any number of predetermined, fixed attitudes relative to the work piece.

Figure 7:
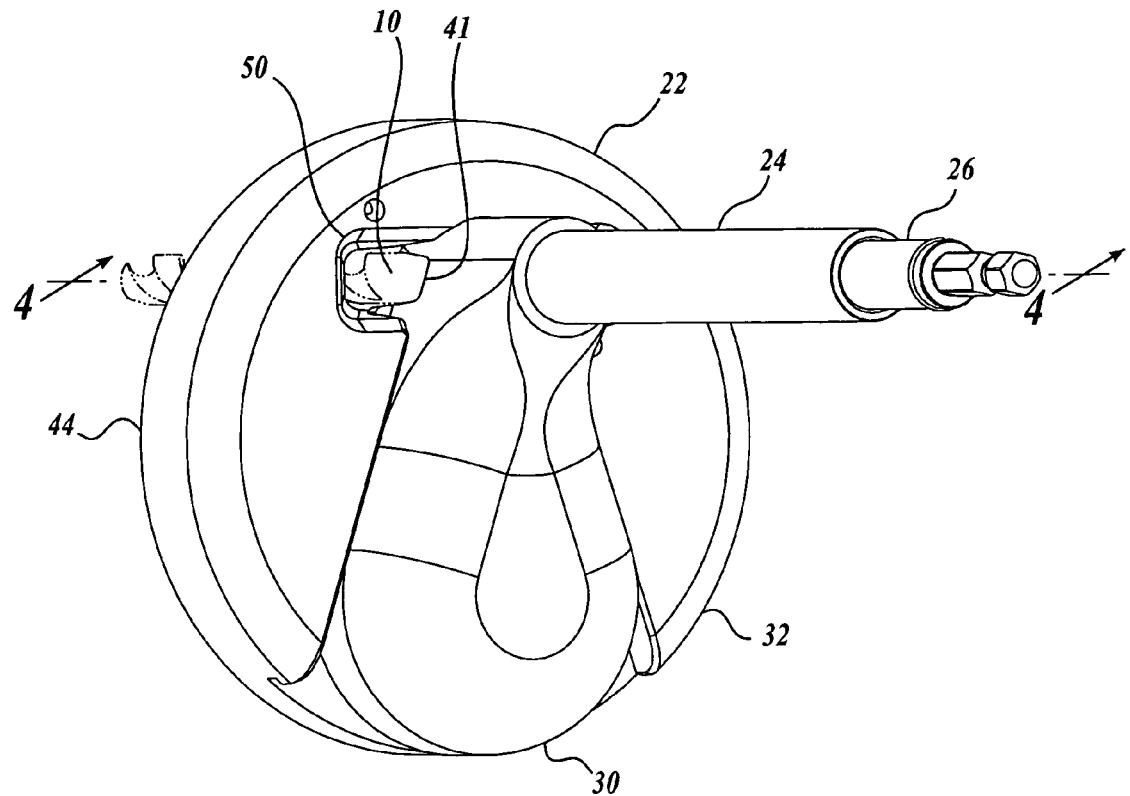
FIG. 7 is a second isometric view of the device of FIG. 1.

The first foot 30 also includes a notch or sight window 41 in the tubular portion 40 adjacent the first forward surface 34 for viewing the work tool 10 through the first foot 30 during operation. The work tool 10 is visible through the first foot sight window 41 when the first foot 30 is used alone, or when the first foot 30 is used in combination with the second foot 32 (FIG. 7). The first foot sight window 41, as used when the first foot 30 is in combination with the second foot 32, will be discussed in greater detail below.

Referring to FIG. 2, the second foot 32 is generally a surface-gripping member, with a first forward surface 44 and a second rearward surface 46. The second rearward surface 46 may include a channel or depression 48 suitably shaped and configured to receive the first foot 30 therein. A hole 50 extends through the second foot 32 in alignment with the tubular portion 40 of the first foot 30.

Figure 6:
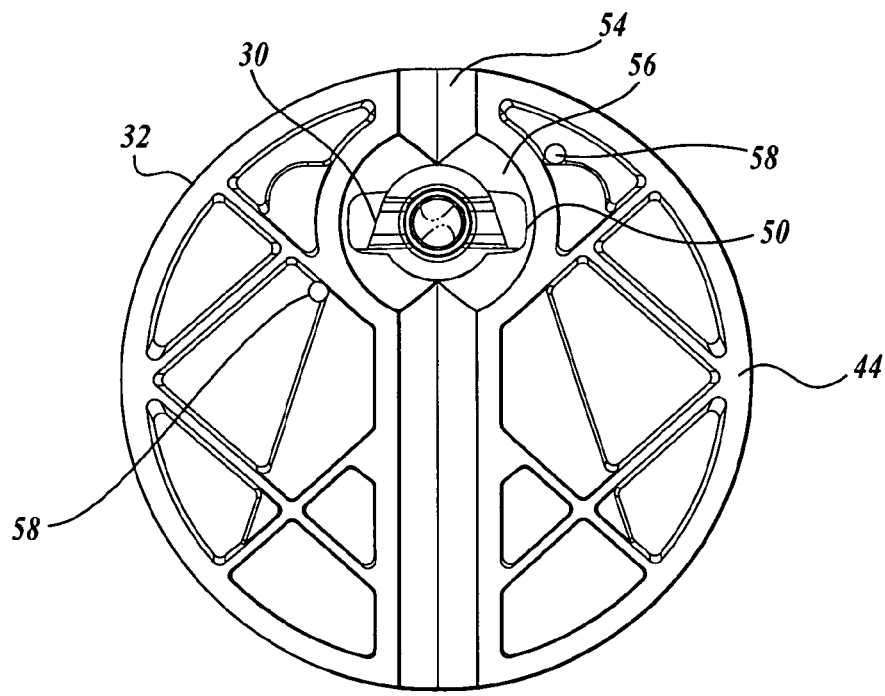
FIG. 6 is a second end view of the device taken from the opposite view of FIG. 5.

The hole 50 is illustrated as offset relative to the geometric center of the first forward surface 44 of the second foot 32, such that the hole 50 is adjacent a peripheral portion of the second foot (FIG. 6). It should be appreciated, however, that a centered hole 50 is also within the scope of the invention.

The hole 50 is suitably sized and configured to receive the work tool 10. When the second foot 32 receives and is in alignment with the first foot 30, the hole 50 of the second foot 32 is in alignment with the aperture 42 of the first foot 30 to permit the passage of at least a portion of a work tool 10 (FIG. 4), as discussed in greater detail below.

Figure 5:
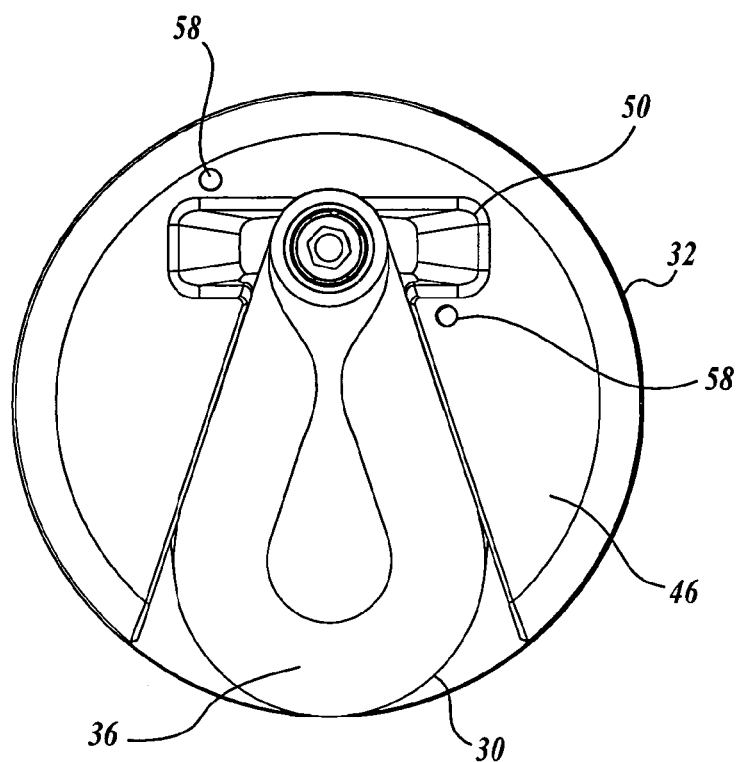
FIG. 5 is an end view of the device of FIG. 1 taken substantially along lines 4-4 thereof.

As a non-limiting example, the hole 50 tapers to decrease in size in the direction toward the first forward surface 44 of the second foot 32 (FIG. 5). Referring to FIG. 7, when the second foot 32 receives and is in alignment with the first foot 30, the tapering hole 50 aligns with the first foot sight window 41 to allow a user to view the work tool 10 as it contacts the work piece through the sight window 41.

Non-tapering holes and holes that taper in the opposite direction are also within the scope of the invention.

Although the tapered hole 50 is illustrated as extending through the second foot 32 at an attitude substantially perpendicular to the first forward surface 44, it should be appreciated that non-perpendicular holes 50 are also within the scope of the invention. For example, the hole 50 may extend through the second foot 32 at an angle that corresponds with the angle of a non-perpendicular tubular portion 40 of the first foot 30, or the hole 50 of the second foot 32 may be large enough to accommodate a tubular portion 40 with an adjustable neck, as described above.

The first forward surface 44 of the second foot 32 is generally a contoured surface configured to correspond with the contoured surface of a work piece. As non-limiting examples, the first forward surface 44 of the second foot 32 may include a substantially 90-angle groove 54 (FIG. 3) and a conical cavity 56 (FIGS. 4 and 6), both aligned with the hole 50. Referring to FIG. 3, the 90-angle groove 54 is configured to receive a 90-angle edge of a work piece, such as the edge of a counter-top. Referring to FIGS. 4 and 6, the conical cavity 56 is configured to receive a spherical work piece, such as a banister ball.

Although a 90-angle groove 54 and a conical cavity 56 are illustrated as suitable contours on the first forward surface 44 of the second foot 32, it should be apparent that other contours on the first forward surface 44 are also within the scope of the invention. Other contours may include other angled grooves, such as 45-degree or 60-degree angle grooves; half-round cavities for receiving pipes or other cylindrically-shaped work pieces; rectangular channels for receiving thin work pieces, such as thin strips of molding or door widths; parallel or non-parallel rails; and a tri-pod or three points of contact for receiving contoured work pieces with non-symmetrical surfaces, such as odd-shaped rocks or corners of cubes and pyramids.

Referring to FIGS. 5 and 6, the second foot 32 may further include two alignment holes 58 for use in centering the hole 50 of the second foot 32 on a thin work piece, such as a thin strip of molding or a door width. The alignment holes 58 are located equidistantly from hole 50 on diametrically opposite sides thereof, and extend from the first forward surface 44 to the second rearward surface 46 of the second foot 32. The alignment holes 58 are each configured to receive a pin (not shown). When the pins are set to straddle the thin work piece and a rotational force is applied to the device 20, the hole 50 of the second foot 32 automatically centers on the thin work piece.

It should be appreciated that the device 20 may be constructed from any suitable materials, including plastics, metals, ceramics, composites, wood, or any combination thereof. For example, the first foot 30 and second foot 32 may be constructed from a transparent material, such as a transparent hard plastic to enable to user to see the work piece through the base 22.

As discussed above, the first foot 30 may be used alone as the base 22 (i.e., without the second larger foot 32). When used alone as the base, the first foot 30 of the illustrated embodiment of FIGS. 1-2 is suitably shaped and configured for use at the edge or in a corner of a work piece. The offset aperture 42 and the tapering tear-drop shape of the first foot 30 provides a sufficiently wide hand grip portion 38 to provide user grip stability, while still allowing the aperture 42 to be positionable on surfaces near edges or in corners. Although the illustrated tear-drop tapering shape is a suitable shape for the first foot 30, it should be appreciated that other shapes, including tapering and non-tapering shapes, are also within the scope of the invention.

Referring to FIGS. 1-4, the sleeve 24 and the shaft 26 will now be described in greater detail. The sleeve 24 is generally a hollow, open-ended, tubular member having a first forward end 70, a second rearward end 72, and an annular shoulder 76 along the exterior surface of the sleeve 24. The first forward end 70 of the sleeve 24 is coupled to the base 22 such that it is in registry with the aperture 42 of the tubular portion 40 of the first foot 30. In the illustrated embodiment, the sleeve 24 may be received within the tubular portion 40 until the annular shoulder 76 contacts the tubular portion 40. The second rearward end 72 of the sleeve 24 extends rearwardly away from the second rearward surface 36 of the first foot 30. Referring to FIG. 2, the second rearward end 72 includes an inner annular groove 74, as will be discussed in greater detail below. The sleeve 24 is configured to closely receive the shaft 26.

The shaft 26 is generally an elongate member having a first forward end 80 and a second rearward end 82. The shaft 26 is closely, rotably, and/or slidably received within the sleeve 24. The first forward end 80 of the shaft 26 includes a first annular groove 86 along the external circumference of the shaft 26. The first annular groove 86 is sized and configured to receive a first retaining clip 90, such as an o-ring or an oval spring, to prevent the shaft 26 from being separable from the sleeve 24. Specifically, referring to FIG. 4, if the shaft 26 is pulled rearwardly away from the sleeve 24, the first retaining clip 90 in the shaft first annular groove 86 will expand and engage the sleeve inner annular groove 74 to prevent the first forward end 80 of the shaft 26 from being separable from second rearward end 72 of the sleeve 24

The second rearward end 82 of the shaft 26 includes a second annular groove 88 along the external circumference of the shaft 26. The shaft annular groove 88 is sized and configured to receive a second retaining clip 92, such as an o-ring or an oval spring, to prevent the shaft 26 from falling forwardly into the sleeve 24. Specifically, the second retaining clip 92 is sized and configured to be larger than the internal diameter of the sleeve 24, such that the second retaining clip 92 cannot forwardly enter the sleeve 24 at the sleeve's second rearward end 72.

Although first and second retaining clips 90 and 92 make up the shaft detent device of the illustrated embodiment, it should be appreciated that other detent devices are also within the scope of the invention, such as the ball detent device disclosed in U.S. Pat. No. 4,736,658, entitled "Screw Holding and Driving Device," the disclosure of which is hereby expressly incorporated by reference.

In the illustrated embodiment of FIGS. 1-4, the shaft first forward end 80 includes a longitudinally-spaced accessory attachment portion 84 for receiving the work tool 10. In the illustrated embodiment (FIG. 4), the accessory attachment portion 84 includes a ball-and-groove attachment mechanism (94 and 96) for securing the work tool 10 on the shaft 26. The ball-and-groove attachment mechanism includes a ball bearing 96 received in a tapered hole 94 extending from the outer surface of the shaft 26 into the shaft bore. The tapered hole 94 is oriented such that it tapers from an opening located on the outer surface of the shaft 26 through to an opening in the shaft bore. The tapered hole 94 is sized and configured to receive the ball bearing 96. As received in the tapered hole 94, the ball bearing 96 is positioned to selectively engage a ball retention groove 14 on the work tool 10 to releasably couple the work tool 10 to the shaft 26.

Although a ball and groove attachment mechanism is illustrated and described herein, it should be appreciated that the work tool 10 may be attached by any suitable tool connector mechanism, such as the connector as disclosed in U.S. Pat. No. 6,543,959, entitled "Two-Way Quick Connector," the disclosure of which is hereby expressly incorporated by reference.

In the illustrated embodiment of FIGS. 1-4, the work tool 10 includes a hex shank attachment end 12, which is received by the accessory attachment end 84 (FIG. 4) of the shaft 26. Although the work tool 10 includes a hex shank attachment end 12 in the illustrated embodiment (FIG. 2), it should be appreciated that the work tool 10 may include other attachment ends suitably shaped and configured to cooperate with the shaft 26. In addition, and as a non-limiting example, the work tool 10 may be permanently attached to the shaft 26, thereby eliminating the attachment end altogether.

The second rearward end 82 of the shaft 26 receives a hex shank 85 that is adapted for attachment to an actuator, such as a power drill, (not shown) for actuating the shaft 26 and the work tool 10. The operation of actuating the shaft 26 and the work tool 10 will be discussed in detail below.

Operation of the device 20 may be best understood by referring to FIGS. 1-7. Generally, the base 22 of the device is abuttable against a work piece (such as a piece of wood, metal, or rock) for drilling (or otherwise extending) an aperture into at least a portion of the work piece.

Using the base 22 comprising the first foot 30 (i.e., without the second larger foot 32), the first forward surface 34 of the first foot 30 is abuttable against a substantially flat surface of a work piece for orienting a work tool 10 at a predetermined attitude relative to the surface of the work piece. In the illustrated embodiment of FIGS. 1-7, the predetermined attitude of the device is about 90-degrees.

When the first forward surface 34 of the first foot 30 abuts the work piece, an actuating device, such as a power drill (not shown), can be used to rotate the shaft 26 and the work tool 10. The sleeve 24 maintains the shaft 26 and the work tool 10 at a predetermined attitude relative to the work piece, such that the entire aperture drilled (or otherwise extended) into the work piece is at an attitude of about 90-degrees.

Using the combination base 22, comprising the first smaller foot 30 and the second larger foot 32, the first forward surface 44 of the second foot 32 is abuttable against a variety of contoured surfaces, including an edge (such as a 90-degree edge), a spherical surface, a cylindrical surface, a thin rectangular surface, or any other contoured surfaces whether symmetrical or not.

When the first forward surface 44 of the second foot 32 abuts the contoured work piece, an actuating device, such as a power drill (not shown), can be used to actuate the shaft 26 and the work tool 10 relative to the contoured work piece. The sleeve 24 maintains the shaft 26 and the work tool 10 at a predetermined attitude relative to the contoured work piece, such that the entire aperture drilled (or otherwise extended) into the work piece is at an attitude of about 90-degrees.

As noted above, with a base 22 comprising either the first foot 30 or the combination of the first foot 30 and the second foot 32, other predetermined attitude positions besides about 90-degrees are also within the scope of the invention.

Figure 9:
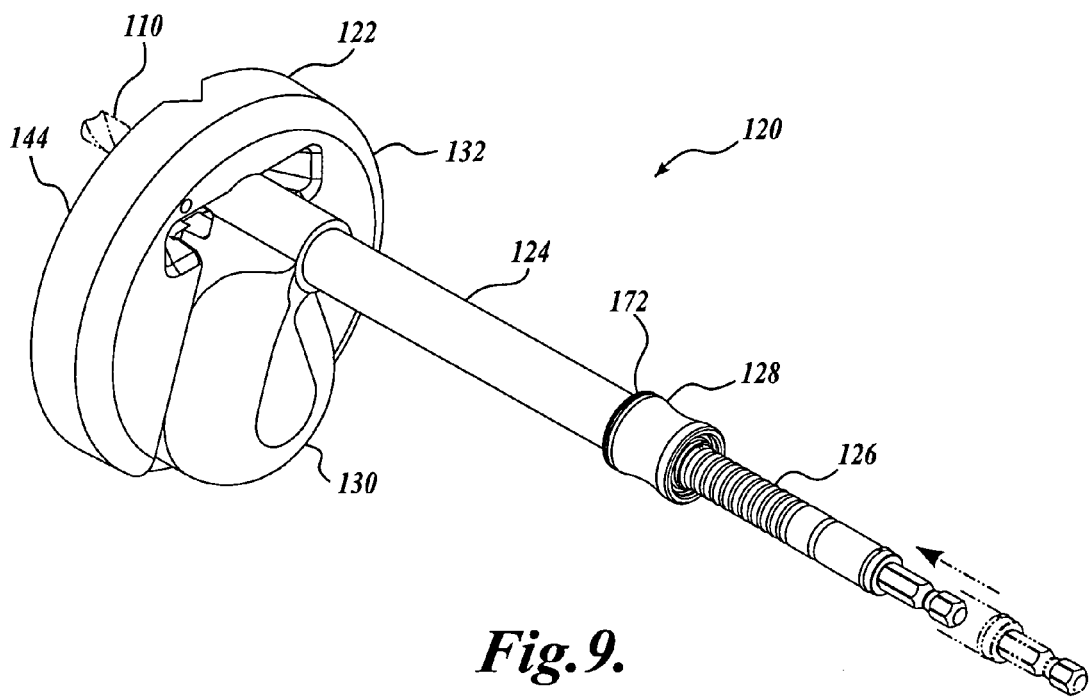
FIG. 9 is an isometric view of the device of FIG. 7 in a second position.
Figure 10:
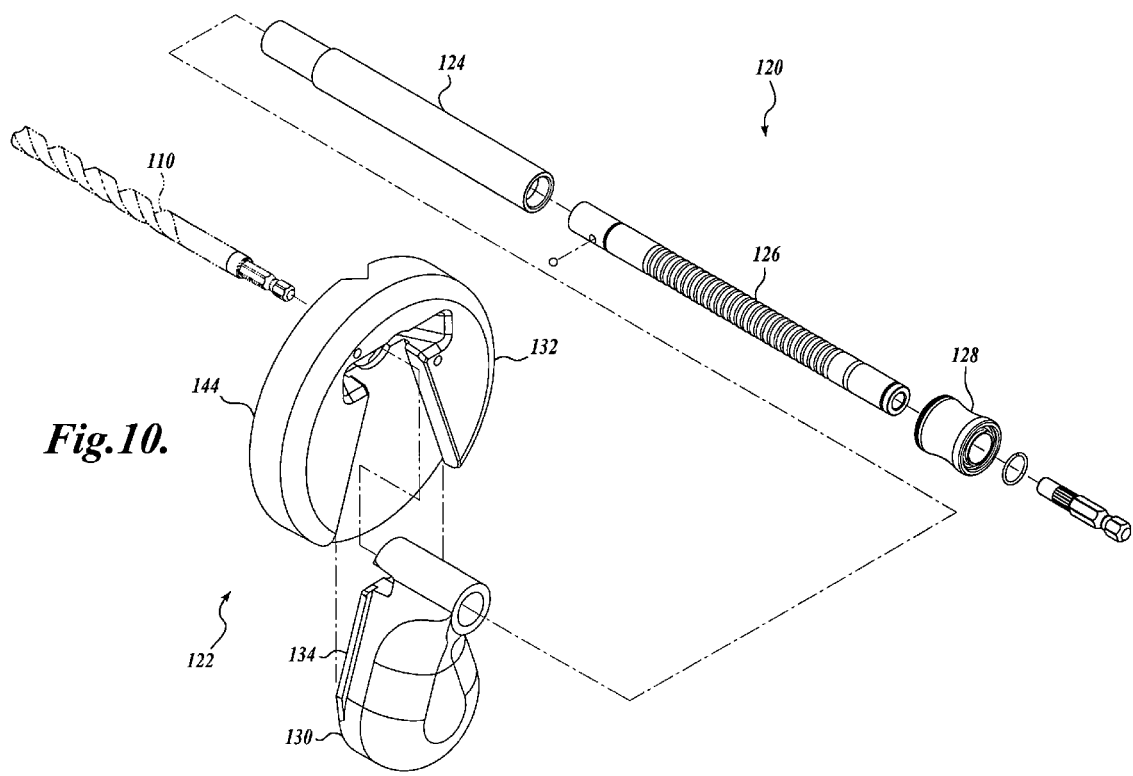
FIG. 10 is an exploded view of the device of FIG. 7.

Now referring to FIGS. 8-10, a device 120 constructed in accordance with another embodiment of the present invention will be described in greater detail. The device 120 is substantially identical in structure and operation to the previously described embodiment, with the exception that the device 120 includes means for controlling the drilling of the work tool 110 into a work piece at a predetermined measurement, such as a measurement marked by a stop 128. Accordingly, the components of device 120 that are the same or similar to the corresponding components of the device 20 are identified by corresponding part numbers in the 100 series.

An adjustable stop 128 is coupled to the shaft 126 for translational movement along the shaft 126. The adjustable stop 128 is selectively positionable along the shaft 126 at a desired stop position (FIGS. 8 and 9). In the illustrated embodiment, the shaft 126 is grooved to receive a ball and groove adjustable stop 128, wherein a ball bearing is positioned within the stop 128 to selectively engage an adjustment groove on the exterior of the shaft 126. It should be appreciated, however, that a non-grooved shaft and a non-ball-and-groove stop is within the scope of the present invention. It should also be appreciated, that a not-adjustable stop is also within the scope of the present invention.

Figure 8:
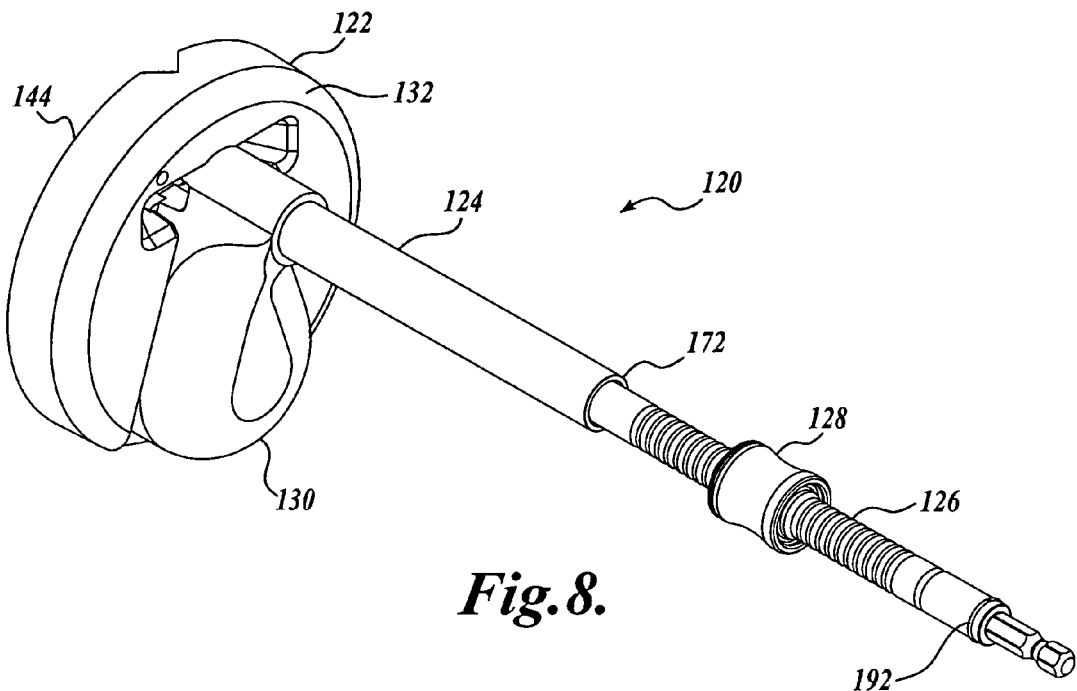
FIG. 8 is an isometric of a device for orienting a work tool at a predetermined attitude relative to a work piece in accordance with a second embodiment of the present invention in a first position.

Describing the operation of the device 120, when the first surface (134 or 144) of the base 122 (whether the base comprises the first foot 130 or the combination of the first foot 130 and second foot 132) abuts a surface of the work piece, an actuating device, such as a power drill (not shown), can be used to actuate the shaft 126 and the work tool 110 relative to the surface of the work piece (FIG. 8). The shaft 124 and the work tool 110 can only be actuated, however, until the stop 128 comes into contact with the second rearward end 172 of the sleeve 124 (FIG. 9), preventing the work tool 110 from further drilling (or otherwise extending) into the surface of the work piece.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A device for orienting a work tool at a predetermined attitude relative to a work piece, comprising:
   (a) a base having first and second surfaces, the first surface being abuttable against a work piece, wherein the base includes a first smaller foot and a second larger foot matable with the first smaller foot, wherein the base further includes a sight window for viewing the work tool, wherein the sight window is formed by a notch in the first smaller foot and a hole in the second larger foot, wherein the notch and the hole align to form a line of sight through the base;
   (b) a sleeve coupled to the base; and
   (c) a shaft slidably receivable within the sleeve, the shaft having a first end portion and a second end portion, wherein the first end portion is connectable to the work tool and the second end portion is connectable to an actuator for actuating the work tool.

2. The device of claim 1, wherein the first surface of the base is contoured to correspond with the contour of the work piece.

3. The device of claim 1, wherein the contoured surface of the base comprises an angled groove for abutting against a work piece.

4. The device of claim 3, wherein the angled groove is a substantially 90-angle groove.

5. The device of claim 1, wherein the contoured surface of the base comprises a conical cavity for abutting against a work piece.

6. The device of claim 1, further comprising a hand grip on the second surface of the base.

7. A device for orienting a work tool at a predetermined attitude relative to a work piece, comprising:
   (a) a base having first and second surfaces, the first surface being abuttable against a work piece, wherein the base includes a first smaller foot and a second larger foot matable with the first smaller foot, wherein the base further includes a sight window extending through at least a portion of the base, wherein the sight window is formed by a notch in the first smaller foot and a hole in the second larger foot, wherein the notch and the hole align to form a line of sight through the base to visualize the work tool when the work tool is connected to the first end portion of the shaft;
   (b) a sleeve coupled to the base; and
   (c) a shaft slidably receivable within the sleeve, the shaft having a first end portion and a second end portion, wherein the first end portion is connectable to a work tool and the second end portion is connectable to an actuator for actuating the work tool.

8. The device of claim 1, further comprising an adjustable stop coupled to the shaft controlling translational movement along the shaft.

9. The device of claim 8, wherein the shaft is a grooved shaft.

10. The device of claim 1, wherein the sleeve is positioned transverse to the first surface of the base.

11. The device of claim 1, wherein the base includes an aperture to releasably receive a work tool.

12. The device of claim 1, wherein the work tool is a drill bit.

13. The device of claim 11, wherein the aperture is offset relative to the geometric center of the base.

14. The device of claim 11, wherein the aperture is adjacent a peripheral portion of the base.

15. A device for orienting a work tool at a predetermined attitude relative to a plane, comprising:
   (a) a base having a first surface abuttable against a work piece, wherein the base includes a first smaller foot and a second larger foot matable with the first smaller foot, wherein the base further includes a sight window for viewing the work tool, wherein the sight window is formed by a notch in the first smaller foot and a hole in the second larger foot, wherein the notch and the hole align to form a line of sight through the base;
   (b) a sleeve coupled to the base to project from the base in a direction away from the first surface of the base;
   (c) a shaft slidably receivable within the sleeve, the shaft having a first end portion and a second end portion, wherein the shaft first end portion is connectable to a work tool and the second end portion of the shaft is connectable to an actuator for actuating the work tool; and
   (d) a stop coupled to the shaft.

16. The device of claim 15, wherein, the stop is an adjustable stop for translational movement along the shaft.

17. The device of claim 16, wherein the shaft is a grooved shaft.

18. The device of claim 1, wherein the sight window allows a user to visualize the work tool when the work tool is connected to the first end portion of the shaft.

19. A device for orienting a work tool at a predetermined attitude relative to a work piece, comprising:
   (a) a base having first and second surfaces, the first surface being abuttable against a work piece, wherein the first surface is a contoured surface including a substantially 90-angle groove and a conical cavity for abutting against a work piece;
   (b) a sleeve coupled to the base; and
   (c) a shaft slidably receivable within the sleeve, the shaft having a first end portion and a second end portion, wherein the first end portion is connectable to the work tool and the second end portion is connectable to an actuator for actuating the work tool.

* * * * *